United States Patent [19]
Silverman

[11] 3,934,673
[45] Jan. 27, 1976

[54] VIBRATOR SYSTEMS FOR GENERATING ELASTIC WAVES IN THE EARTH

[76] Inventor: Daniel Silverman, 5969 S. Birmingham St., Tulsa, Okla. 74105

[22] Filed: Feb. 1, 1974

[21] Appl. No.: 438,698

Related U.S. Application Data

[63] Continuation-in-part of Ser. No. 223,896, Feb. 2, 1972, Pat. No. 3,789,951.

[52] U.S. Cl. .................. 181/119; 181/121; 340/17
[51] Int. Cl.² ........................................... G01V 1/14
[58] Field of Search ....... 181/114, 119, 121; 340/17

[56] References Cited
UNITED STATES PATENTS

| | | | |
|---|---|---|---|
| 3,363,720 | 1/1968 | Mifsud et al. | 181/114 |
| 3,373,841 | 3/1968 | Miller, Jr. | 181/119 |
| 3,578,102 | 5/1971 | Ross | 181/119 |
| 3,718,205 | 2/1973 | Fair et al. | 340/17 |
| 3,789,951 | 2/1974 | Silverman | 181/119 |
| 3,840,090 | 10/1974 | Silverman | 181/119 |

*Primary Examiner*—Malcolm F. Hubler
*Assistant Examiner*—H. A. Birmiel

[57] ABSTRACT

This abstract describes vibrator systems for generating elastic waves in the earth, in which an actuator has a mechanical output drive means responsive to an electrical oscillatory signal, the drive means operates a variable volume compartment filled with fluid, which is connected by conduit to a least one vibrator, comprising an expandable closed chamber connected between a base plate and a reaction mass. Two or more compartments can be used with two or more actuator drive means, the compartments connected separately to a plurality of vibrators. The vibrators may operate in-phase on in phase opposition. The plurality of vibrators may operate in horizontal and/or vertical arrays.

17 Claims, 15 Drawing Figures

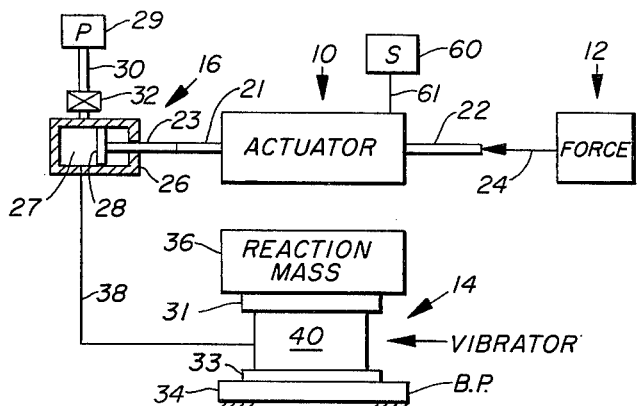
FIG. 1
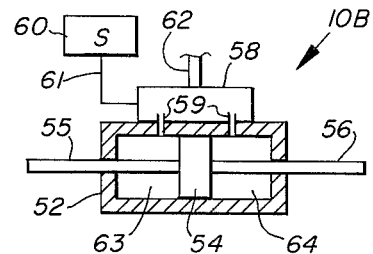
FIG. 2B
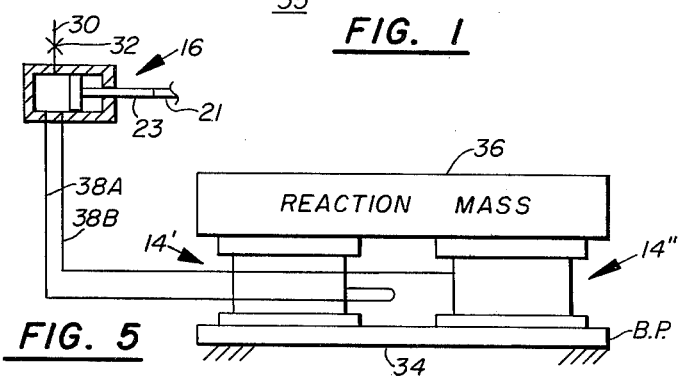
FIG. 5
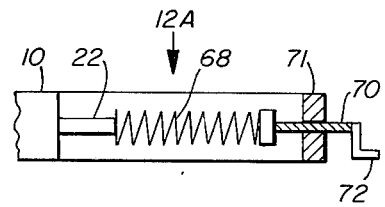
FIG. 3A
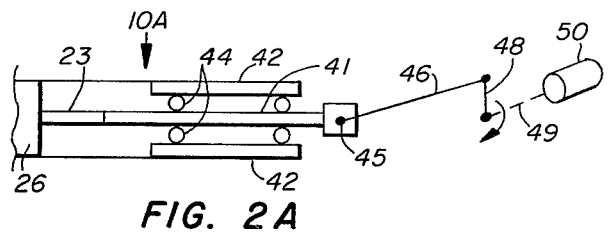
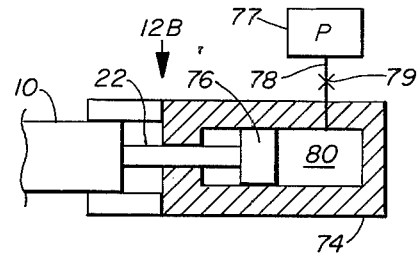
FIG. 3B
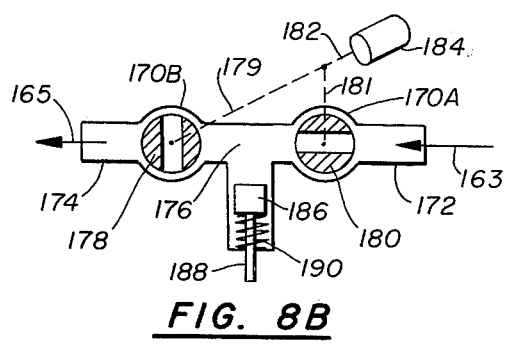
FIG. 2A
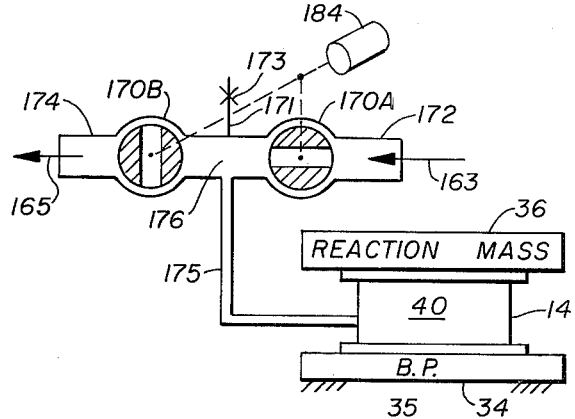
FIG. 8B
FIG. 8C
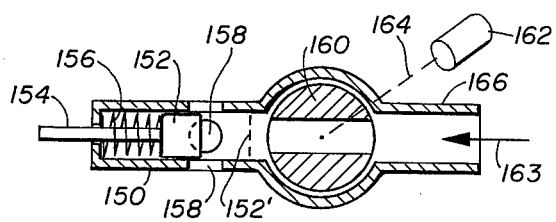
FIG. 8A

VIBRATOR SYSTEMS FOR GENERATING ELASTIC WAVES IN THE EARTH

CROSS REFERENCE TO RELATED APPLICATION

This application is a continuation-in-part of my co-pending application Ser. No. 223,896, filed Feb. 2, 1972, entitled "Vibrator Systems for Generating Seismic Waves in the Earth" now U.S. Pat. No. 3,789,951, granted Feb. 5, 1974. Ser. No. 223,896 is made a part of this application by reference. U.S. Pat. No. 3,727,122 is also entered into this application by reference. This application is also related to Disclosure Document No. 008,213 filed Dec. 16, 1971, and to Disclosure Document No. 011,478, filed June 20, 1972.

BACKGROUND OF THE INVENTION

This invention lies in the field of high power vibrators, such as are used in the seismic method of geophysical prospecting.

The background of the vibrator methods of seismic prospecting is fully covered in my copending application Ser. No. 223,896, which is made part of this application by reference, and need not be repeated here.

SUMMARY OF THIS INVENTION

It is a primary object of this invention to provide a vibrator system in which a closed hydraulic liquid system, under pressure, is used to expand and/or contract, cyclically, two relatively reciprocating parts of an expandable chamber, positioned between a reaction mass and a base place resting on the earth.

It is a further object to control the liquid flow into and out of said chamber by use of an expandable compartment connected to the chamber by means of a conduit, the compartment being compressed and expanded by a mechanical actuator, which can be electromechanical or electrohydraulic.

It is a further object of this invention to provide a vibrator system which has a plurality of separate vibrator units connected in parallel between the reaction mass and the base place, and arrayed in a two-dimensional horizontal array close to the base plate to provide a lesser mass of moving system and greater lateral stability.

These and other objects are accomplished, and the limitations of the prior art are overcome in the design of the present invention, by using one or more closed expandable chambers supporting a reaction mass on top of a base plate. An actuator means having a mechanical output drive means that follows a selected oscillatory pattern signal is used to alternately compress and expand a closed compartment. The compartment and chamber are connected by a conduit and all three are filled with high pressure liquid, thus, as the output drive means compresses the compartment, the chamber expands, and vice versa.

There can be a single chamber, or a plurality of chambers connected in parallel to the compartment.

There can be two compartments driven in opposite phase by the output actuator drive means, the two compartments connected separately to two chambers adapted to operate in opposite phase, etc.

A reaction force means is provided to oppose the steady state force on the actuator output drive means by the fluid pressure in the compartment, thus the actuator means supplies only the alternating component of the force on the compartment.

BRIEF DESCRIPTION OF THE DRAWINGS

These and other objects of this invention and a clear understanding of the principles and details of the invention will be evident from the following description taken in conjunction with the appended drawings, in which:

FIG. 1 is a generalized view of the system of this invention in its simplest form.

FIGS. 2A, 2B illustrate an electro-mechanical and an electrohydraulic actuator drive means.

FIGS. 3A, 3B illustrate two types of reaction force systems.

FIG. 5 illustrates the system of FIG. 1 with a plurality of chambers in parallel and in synchronism.

FIGS. 8A, 8B, 8C illustrate valve controlled gas systems for control of vibrators, directly and through actuators.

DESCRIPTION OF THE PREFERRED EMBODIMENTS

Figure 7A:
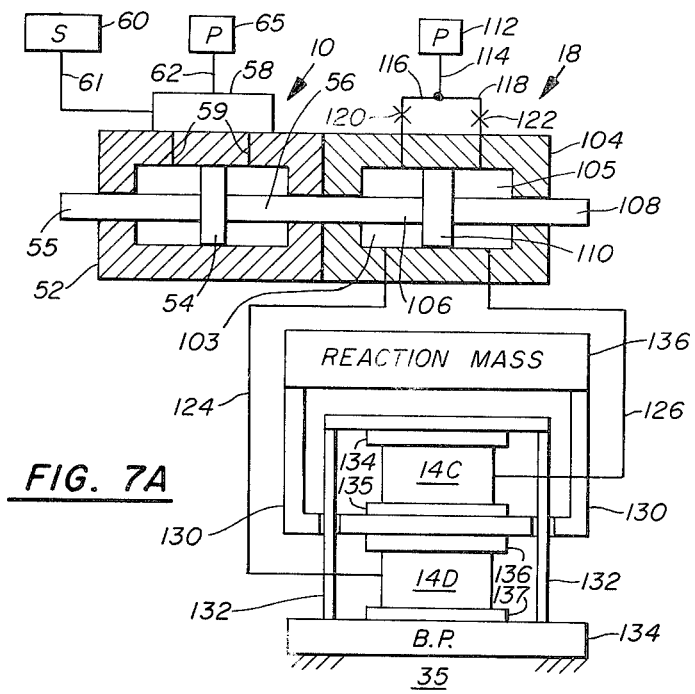
FIGS. 7A, 7B illustrate two systems using a plurality of chambers in opposite phase of operation.

Referring now to the drawings, and in particular to FIG. 1, there is shown an actuator indicated generally by the numeral 10, which is controlled by an electrical or mechanical means controlled by a signal S, numeral 60 and lead 61. The actuator has a mechanical output drive means having two colinear shafts 21, 22. One shaft is coupled to a piston rod 23 connected to a piston 28 in a cylinder 26. The cylinder 26, piston 28, and piston rod 23 form one type of a variable volume compartment indicated generally by the numeral 16 controlled by the actuator 10 through drive means 21.

There is a vibrator indicated generally by the numeral 14 having a variable volume chamber 40 having two parts, or frames 31, 33, one 31 connected to a reaction mass 36, and the other 33 connected to a base plate 34 resting on the earth 35. The compartment 16 is connected to the vibrator 14 by conduit 38 and the entire joined volume of compartment, conduit and chamber is filled with liquid from a pressurized accumulator 29, through pipe 30 and valve 32. When the internal volume is filled with liquid (without any gas bubbles) any change in the volume 27 of the compartment 16 causes a corresponding opposite change in the volume of the vibrator 14. Thus, oscillation of the piston 28 by the actuator 10 will cause a corresponding oscillation of the mass 36 with respect to the base plate 34.

It will be clear that the weight of the mass 36 is supported by the fluid pressure in the chamber 40. This steady pressure is supplied by the accumulator 29. Also, this pressure in space 27 causes a steady force to the right on the actuator rod 21, which is opposed by an equal and opposite force 24 exerted on the rod 22 by the reaction force means 12. Thus, in steady state, the forces are all balanced. To oscillate the mass 36, the actuator need only supply an oscillatory force approximately equal to the force required to relatively move the mass 36 and base plate 34.

Referring now to FIGS. 3A and 3B, two examples of force systems 12A, 12B are shown, both of which are springs. In FIG. 3A a helical steel spring 68 is shown, the compression in which is controlled by a crank 72 and screw 70 passing through the wall 71. The spring pushes on the end of the shaft 22, opposing the force on the rod 21 due to the pressurized liquid in space 27. In FIG. 3B the opposing force is generated by a pressurized gas in space 80 of cylinder 74, the piston of which is driven by rod 22. The pressure in 80 is set by source 77 and valve 79 to provide the desired reaction force. Of course, other types of force systems which can supply a relatively constant force even with considerably amplitude of motion of the rod 22, such as electromagnetic systems, can be used.

In FIGS. 2A, 2B are shown two types of actuators, an electro-mechanical drive and an electrohydraulic drive. FIG. 2A shows a rod 41 adapted to longitudinally reciprocate in bearings 44 in a housing 42. The rod 41 is connected to a crosshead 45, a connecting rod 46, a crank 48 connected to a shaft 49 driven by a motor 50. The motor can be a variable speed electric, or hydraulic motor, as is well known in the art, under control of a suitable control signal, not shown, but well known in the art.

An electrohydraulic actuator is shown in FIG. 2B. This comprises a cylinder 52, with piston 54 and piston rods 55, 56 corresponding to rods 21, 22 of FIG. 1. A valve system 58 connected by ports 59 to the cylinder 52 and by conduit 62 to a high pressure liquid accumulator, serves to oscillate the piston 54 under control of a signal means 60 through leads 61. The vibrator control systems used in seismic vibrator operations can be used in this application.

Figure 4C:
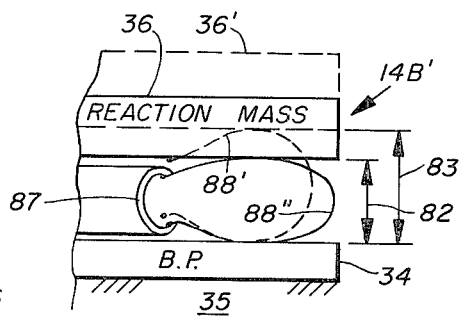
FIGS. 4A, 4B and 4C illustrate three types of vibrator elements.
Figure 4A:
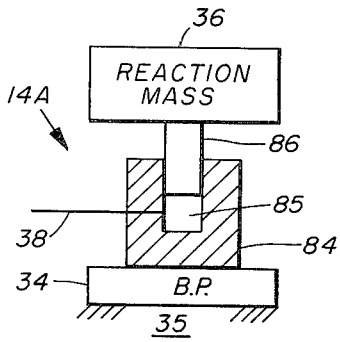
Figure 4B:
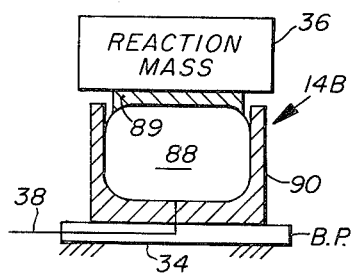

Referring now to FIGS. 4A, 4B, 4C three types of variable volume chambers 14A, 14B, 14C are shown. FIG. 4A shows a hydraulic ram, or cylinder 84 and piston 86 sealed into the cylinder. The piston 86 supports a reaction mass 36. The cylinder 84 is supported on the base plate 34, which rests on the surface of the earth 35. The internal volume 85 of the cylinder 84 is connected by conduit 38 to the compartment 16 of FIG. 1.

The volume 85 of chamber 14A is varied by the sealed sliding of the piston into and out of the cylinder. Both parts are rigid and the operation is dependent on adequate seals, which are well known in the art. The technique illustrated in FIG. 10 of copending application Ser. No. 223,896 using pressure guarded seals 165, 166 can, of course, be used in connection with chamber 14A, and elsewhere in this invention.

The chamber 14B illustrated in FIG. 4B differs from 14A in that a closed flexible walled chamber 88 is used. This is contained in a cylindrical wall 90 and a top plate 89 adapted to be guided by the wall 90. The conduit 38 enters the chamber 88 through a suitable fitting in the top or bottom plates 89 or 90. The flexible walled chamber, or bag 88 can be of reinforced flexible, molded material, such as used widely in commercial vehicles as springs etc. These bags support heavy loads and endure shock forces, and countless repetitive oscillations without failure. Gas or liquid under pressure can be used. Such air bags are commonly used as compliances, or air springs, between the columns supporting the truck and the base plate in seismic vibrators. Another form of flexible walled chamber would be an automabile tire 88' (FIG. 4C) mounted on a rim 87 and supporting the reaction mass 36 from the base plate 34.

For the underinflated condition 88" the neutral spacing between mass 36 and base plate 34 is 82. For the overinflated case the spacing is 83, with the tire and mass shown in dashed line. Various combinations of fluid pressure, internal volume, area of contact of support, etc. can be used in various embodiments of the vlexible walled containers.

FIG. 5 is patterned after FIG. 1 but with a plurality of vibrators 14' and 14" connected in parallel between the reaction meass 36 and the base plate 34. By using a suitable number of chambers spaced in a two dimentional array, such as a triangle or rectangle, for example, a much greater lateral stability is provided for the heavy reaction mass 36, than is possible with the single piston and cylinders provided in conventional vibrators today. This is particularly true when the truck itself is used as the reaction mass, as disclosed in copending application Ser. No. 223,896. Also, if two or more vibrators are used, they can be disposed on either side of a central drive shaft of the transport vehicle as disclosed in Ser. No. 223,896.

The two chambers 14' and 14" can be connected to the same compartment 16, if desired, in which case it is desirable to make the two conduits 38A, 38B of the same dimensions of area, length and volume.

Figure 6:
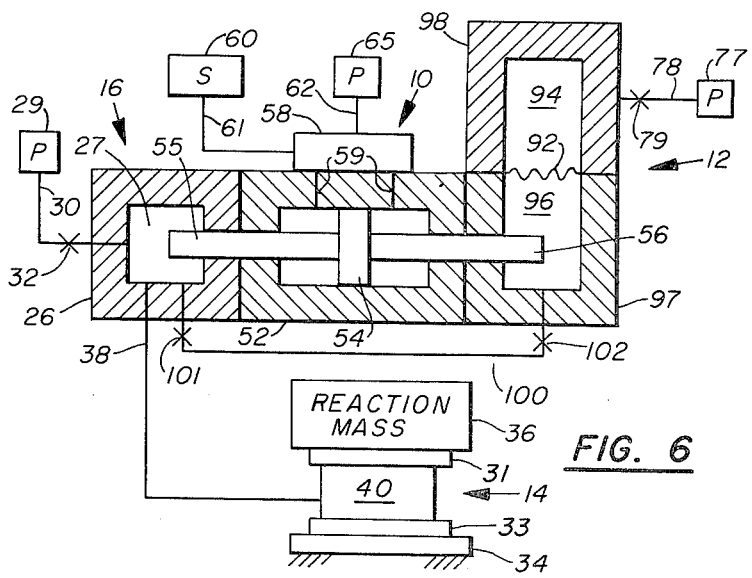
FIG. 6 illustrates a system employing an electrohydraulic actuator drive means.

In FIG. 6 is shown a modification of the embodiment of FIG. 1 in which a hydraulic actuator 10 is used, with a compartment 16 and a gas spring force means 12, with a chamber 14 as in FIG. 1. The hydraulic actuator 10 comprises a cylinder 52 with piston 54 and two piston rods 55, 56 corresponding to the rods 21 and 22 of FIG. 1. The rod 55 acts as a piston in the compartment 16 comprising a cylinder 26. The pressure accumulator 29, conduit 30 and valve 32 are the same as in FIG. 1. The valve 32 is opened to pressurize the system, but is closed when the vibrator 14 is operating.

The opposite rod 56 acts as a piston in a cylinder 97 connected through a flexible diaphragm 92 to a gas or air chamber 98 with internal volume 94 pressurized by high pressure gas accumulator 77 through conduit 78 and valve 79. The two cylinders 26 and 97 are connected by bypass 100 with valves 101, 102. The vibrator chamber 40 is connected to compartment 16 by conduit 38.

In operation, the cylinder 52 is filled with high pressure oil from accumulator 65 through line 62, through valve 58 to the cylinder through ports 59. The valve 58 is controlled by signal S, 60 through means 61 as is well known in the art. The valves 32, 101, 102 and 79 are opened and the compartments 27, 96 and chamber 40 are filled with liquid, and space 94 filled with gas. When everything is balanced, and all moving parts are centralized, the four valves 32, 79, 101, 102 are closed. The pressure in the liquid system should be sufficient to support the mass 36 in its proper intermediate position. Thereafter, hydraulic fluid applied to valve 58 and control signal 60 applied to the valve 58 will cause the piston 54 to oscillate, and the vibrator or vibrators 14, 14', 14" to oscillate in synchronism.

A preferred embodiment is shown in FIG. 7A. Here the hydraulic actuator 10 is similar to that in FIG. 6. The piston rod 56, however, is connected to piston rod 106 of a cylinder 104 and piston 110. Thus two volumes 103, 105 are provided which vary in volume in opposite phase, as the piston 54 oscillates.

Two vibrators 14C 14D are positioned vertically, 14C on top of 14D. The top 134 of 14C is connected by frame 132 to the base plate 134 on which rests part 137 of vibrator 14D. The other two parts 135, 136 are attached, on top and bottom of frame 130 which supports the mass 136. As 14D expands as the piston 110 moves to the left and liquid flows from space 103 through conduit 124, the chamber 14C must contract because of frame 132. This is taken care of by the expansion of space 105 pulling liquid from 14C through conduit 126. Since the liquid system in 14C, 14D etc. is pressurized by source 112 through pipes 114, 116, 118 and valves 120, 122, the lesser changes in pressure due to the piston 110 never cause a negative pressure, and therefore there is no cavitation.

The systems 10 and 18 of FIG. 7A are equivalent to that of FIG. 6 with a rigid plate substituted for the flexible diaphragm 92. The cylinder 97 becomes similar to the compartment 16. Thus, two separate compartments 16A, 16B can be used as in FIG. 7B instead of the cylinder 104.

It will be clear that the vibrator system can consist of a plurality of horizontally, two-dimensionally arrayed, separate elements or chambers, as a single large diameter (but vertically small) chamber. It would be helpful in such a case to provide cables or linkages to ensure parallelity of motion of the top and bottom plates of the single large chamber and also for the top and bottom frames that connect the separate small chambers. Such means to control the parallel motion of the top and bottom frames is well illustrated in patent art on seismic vibrators as concern the parallel motion of the base plate and the frame of the vehicle.

Figure 7B:
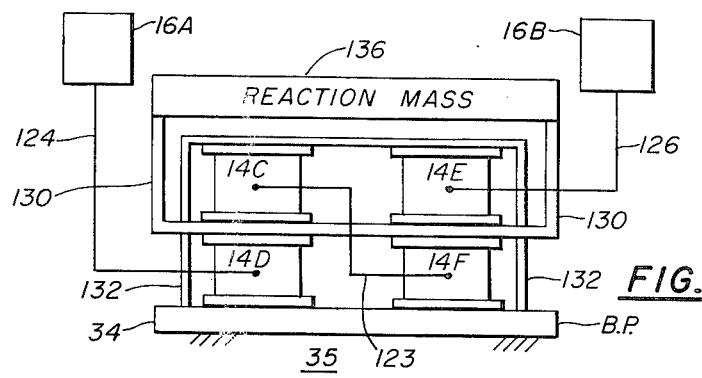

As was described in connection with FIG. 7A there is a way to ensure parallel motion of the two frames of the vibrator, and that is illustrated in FIG. 7B. There are four chambers 14C, 14D, 14E, 14F and two compartments 16A, 16B. Compartment 16A is connected by conduit 124 to 14D. Chamber 14C is connected by conduit 123 to chamber 14F, and chamber 14E is connected by conduit 126 to compartment 16B. Thus, since the same volume of liquid moves into 14D as moves into 14F, and the same liquid moves out of 14C and out of 14E, the two frames 130, 132 move parallel to each other, without any control means. This provides complete rotational stability for the heavy reaction mass, as the vehicle when clamped to the reaction mass 136 as described in application Ser. No. 223,896.

There has recently been issued a U.S. Pat. No. 3,701,968 which describe the use of low pressure air to support a reaction mass, and to exert an oscillating force on the earth. Using such sources of pressurized gas, an electro-pneumatic actuator can be provided as in FIGS. 8A, 8B, and/or a direct application of pulsations of high pressure gas can be applied directly to the chamber 14 as in FIG. 8C.

In FIG. 8A is shown a cylinder 150 with a piston 152 and piston rod 154 which corresponds to the actuator rod 21 of FIG. 1. A spring 156 restrains the piston in the cylinder. The piston is shown in one extreme position. The other position is shown by the dashed line 152'. There is one, or a plurality of vents 158, which are uncovered as the piston moves to the left. A rotary valve 160 is driven at selected speed by motor 162 through drive 164. Pressurized gas (such as air) enters the conduit 166 in accordance with arrow 163. When the valve 160 is open (as shown) gas flows through the valve and forces the piston 152 to the left, compressing the spring 156. As the gas pressure builds up on the piston it moves far enough to the left to uncover the vents 158, dropping the pressure. By that time the valve 160 has rotated 90°, closing off the air to the cylinder. The spring forces the piston back to the point 152', by which time the valve turns another 90°, to open, and again causing the piston to move to the left, to repeat the cycle.

The spring 156 should be chosen of such spring constant that with the mass of the piston 152 and the constants of the compartment 16, the period of oscillation should be approximately in the center of the range in frequency of the signal, and thus of the frequency of valving. The motor 162 would be driven by well known servo means to follow the desired sweep signal supplied by source 60, for example, of FIGS. 1, 2B.

Another system of valving for the piston 152 of FIG. 8A is shown for the piston 186 of FIG. 8B. Here two valves 178, 180 are shown driven synchronously, 90° out of phase by drive means 179,181,182, respectively, by motor 184. As in FIG. 8A, the motor would be controlled by source 60 of FIG. 1, 2B. Again pressurized gas would enter conduit 172 in accordance with arrow 163, would pass through valve 180 into cylinder 176, out through valve 178 and exit conduit 174 in accordance with arrow 165, to the atmosphere. While any gas can be used, for convenience, the apparatus will be described in terms of air. For example, an air compressor or blower would be used to provide the inlet air at 172.

When valve 180 is open and 178 closed, pressurized air flows into the cylinder 176 and causes the piston 186 to move down, compressing the spring 190, and causing the operating rod 188 to move against the piston rod 23 of the compartment 16 of FIG. 1, for example. Then as the valve 178 opens and the valve 180 closes the pressurized air in 176 discharges to the atmosphere, and the piston 186 moves up again, ready for the next cycle of operation, as the valve 180 again opens.

If desired, as indicated in FIG. 8C the cylinder 176 can be connected by conduit 175 so that the pressure of the source of air at 172 is used directly to pressurize the chamber 40. The action of the two valves 170B, 170A, as described in connection with FIG. 8B provides the pulsating fluid pressure to operate the vibrator 14. The flow of pressurized fluid shown by arrow 163 can be liquid or gas. If liquid, a high pressure gas chamber, such as 94 of FIG. 6 would be connected to cylinder 176 to absorb pulsations.

It will be clear that the valve system including inlet 172, valve 170A, cylinder 176, valve 170B and outlet 174 is equivalent to the compartment 16 of FIG. 1 or 16A of FIG. 7B. A second similar system driven by the same motor 184 but 180° out of phase, would then be equivalent to 16B of FIG. 7B. Therefore, such two systems powered by the same motor 184 and the same fluid source could be used with chamber configuration as shown in FIGS. 7A and 7B. The preferred system would be with the two valve systems and six or eight chambers, with three or four groups of two chambers, such as 14C, 14D. The case of four groups arranged in a square, which would provide optimum lateral or rotational stability (such as when the vehicle is used as the reaction mass). In this case one valve system would connect to chamber 14D, 14C would connect to 14F, 14E would connect to 14H, 14G would connect to 14J, and 14I would connect to the other valve system.

In FIG. 8C, instead of using the second valve 170B, it can remain closed, and an adjustable air leak, indicated by the pipe 171 and valve 173, can be used to expell gas from the space 176. Then as the valve 170A rotates, the chamber 40 will expand when the valve is open and contract when the valve is closed. This would be a simpler, but less efficient system than that shown in FIG. 8C.

In FIGS. 2A, 8A, 8B, 8C a motor drive is shown as the source of power or of control of a fluid system. This motor can be used as a variable speed drive in accordance with conventional servo drives. However, a preferred method of drive would be to use a system similar to that shown in U.S. Pat. No. 3,727,122, granted Apr. 10, 1973, to Hughes et al, and titled "Field Modulated Alternator System and Control Therefor." This is an electrical conversion system in which a high frequency alternator is provided with a low frequency current in its field winding. The low frequency current would be the amplified sweep signal. By use of controlled rectifiers as shown in this patent, an output power current to drive the motor is provided which follows in phase and frequency the field current supply. By the use of a synchronous motor, the drive system would then faithfully follow the applied sweep signal.

Applicant introduces U.S. Pat. No. 3,727,122 into this application by reference.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. A vibrator system for generating seismic waves in the earth, comprising;
    a. at least one vibrator comprising a first expandable closed chamber having two parts which reciprocate with respect to each other, one part in contact with the earth, and the other part connected to a reaction mass;
    b. an actuator drive means controlled in accordance with an oscillatory drive signal and having an output drive means responsive to said drive signal;
    c. a first compartment comprising an expandable closed cavity having two parts which oscillate with respect to each other, the internal volume of said first compartment responsive to said output drive means, said first compartment connected by a first conduit to said first chamber, said first chamber and said first compartment filled with pressurized fluid at a selected pressure P;
    d. said fluid at pressure P in said first compartment creating a first force F1 acting against said actuator output drive means; and
    e. passive means to exert a second force F2 on said actuator output drive means in opposition to and substantially equal to the time average value of said force F1 on said drive means exerted by said fluid in said first compartment.

2. The system as in claim 1 in which said means for exerting said second force F2 on said drive means comprises spring means.

3. The system as in claim 1 in which said means for exerting said second force F2 on said drive means comprises a second compartment filled with pressurized gas.

4. The system as in claim 1 in which said first chamber is a piston and cylinder.

5. The system as in claim 1 in which said first chamber is a flexible walled closed chamber.

6. The system as in claim 1 including a plurality of chambers in horizontal spaced array, each chamber connected through similar conduits to said first compartment.

7. The system as in claim 1 including a plurality of chambers in horizontal spaced array, a plurality of compartments, each driven in parallel by said actuator output drive means, each compartment connected by separate conduit to one of said plurality of chambers.

8. The system as in claim 1 in which said actuator is a motor driven crank and connecting rod means.

9. The system as in claim 1 in which said actuator is a hydraulic cylinder and double acting piston.

10. The system as in claim 1 in which said means to exert said second force comprises
    a. a second chamber connected between said first and second frames but adapted to decrease in volume when said first chamber increases in volume and vice versa;
    b. a second compartment connected to said actuator output means in opposition to said first compartment, said second chamber connected by a second conduit to said second compartment, said second compartment adapted to operate in opposite phase to said first compartment;
    c. all compartments, conduits and chambers filled with fluid at pressure P.

11. The system as in claim 10 in which said first and second compartments comprise the two portions of a cylinder on opposite sides of a piston.

12. The system as in claim 10 including at least four chambers in which a first and third expand together while a second and fourth contract together, said first compartment connected to said first chamber, said third chamber connected by a third conduit to said second chamber, and said fourth chamber connected to said second compartment.

13. The system as in claim 12 in which said four chambers are in a horizontal array on the corners of a rectangle, said first and third chambers at the ends of one diagonal, and the second and fourth chambers at the ends of the second diagonal.

14. A vibrator system for generating seismic waves in the earth, comprising;
    a. a plurality of vibrator elements each comprising an expandable closed chamber having two parts which reciprocate with respect to each other, one part connected to a first frame connected to a base plate, and the other part connected to a second frame connected to a reaction mass;
    b. said plurality comprising two groups of vibrator elements, a first group which all expand and contract in synchronism with each other, and a second group which all expand and contract in synchronism with each other but which operate in phase opposition to those of said first group;
    c. an actuator drive system controlled in accordance with an oscillatory drive signal and having an output drive means responsive to said drive signal;
    d. a first and second compartment, each comprising an expandable closed cavity having two parts which oscillate with respect to each other, the internal volume of each compartment responsive to said drive means, said first compartment operating in opposite phase to said second compartment;

e. said first compartment connected by a first conduit to a first chamber of said first group, the last chamber of said second group connected by a second conduit to said second compartment; and f. each of the other chambers of said second group connected respectively to one of the other chambers of said first group.

15. A gas driven vibrator system for generating seismic waves in the earth comprising;

a. at least two vibrators each comprising an expandable flexible walled closed chamber having two parts which reciprocate with respect to each other, one part in contact with the earth, the other part connected to a reaction mass;

b. a first chamber adapted to expand while the second contracts, and vice versa;

c. a pressurized gas system, and valve means comprising two valves, controlled by a control means responsive to an oscillating electric signal, whereby the gas pressure output of said valve means is responsive to said electrical signal, the gas pressure output of one of said valve means connected to said first chamber and the output of the second valve means connected to said second chamber, while the gas pressure output is connected to said first chamber, said second chamber is connected to a reduced gas pressure, and vice versa.

16. The system as in claim 15 in which said valve means includes a rotating inlet valve and a rotating outlet valve in phase quadrature.

17. The system as in claim 15 in which said valve means includes an inlet valve and a controllable gas leak.

* * * * *